United States Patent

[11] 3,551,637

| [72] | Inventor | Gerald L. Lampson<br>San Diego, Calif. |
|---|---|---|
| [21] | Appl. No. | 723,343 |
| [22] | Filed | Apr. 1, 1968 |
| [45] | Patented | Dec. 29, 1970 |
| [73] | Assignee | Data Science Corporation<br>San Diego, Calif.<br>a corporation of California |

[54] MAGNETIC CONTROL OF A WELDING ARC
7 Claims, 10 Drawing Figs.

| [52] | U.S. Cl. | 219/123 |
|---|---|---|
| [51] | Int. Cl. | B23k 9/08 |
| [50] | Field of Search | 219/121,<br>121P, 123, 124, 125, 137, 117 |

[56] References Cited
UNITED STATES PATENTS

| 2,654,014 | 9/1953 | Schaefer | 219/60 |
|---|---|---|---|
| 3,130,294 | 4/1964 | Regnauld | 219/123 |
| 3,204,081 | 8/1965 | Iceland | 219/125 |
| 3,261,960 | 7/1966 | Lehnert | 219/60 |
| 1,921,572 | 8/1933 | Kinnard | 219/123 |
| 2,152,194 | 3/1939 | Jones | 219/123 |
| 2,844,705 | 7/1958 | Bowman et al. | 219/61 |
| 2,920,183 | 1/1960 | Greene | 219/123 |
| 2,994,763 | 8/1961 | Schultz | 219/123 |
| 3,102,946 | 9/1963 | Fonberg | 219/123 |

FOREIGN PATENTS

| 1,461,241 | 10/1966 | France | 219/123 |
|---|---|---|---|

Primary Examiner—J. V. Truhe
Assistant Examiner—Lawrence A. Rouse
Attorney—Richard K. Mac Neill ABSTRACT: A magnetic control of a welding arc in which a variable duty cycle current is applied to an electromagnet to generate a pulsating magnetic field which is placed in proximity to a welding arc for sweeping the welding arc between two work pieces and varying the dwell time and/or the frequency of the sweep. The dwell time of the sweep can be automatically controlled by heat sensing devices on each of the two work pieces or on different areas of a single work piece. The electrical signals from the sensors are coupled to the current generator for varying the symmetry of the waveform and/or DC level with the frequency being automatically controlled by coupling the electrical output from a speed sensor on the work carriage drive motor to the current generator and an automatic arc positioning control for finely positioning the static position of the arc magnetically by coupling the output from a deviation detector to either a bias electromagnet or to the generator for controlling the DC level.

PATENTED DEC 29 1970 3,551,637

INVENTOR.
GERALD L. LAMPSON
BY
Richard K. Macneill

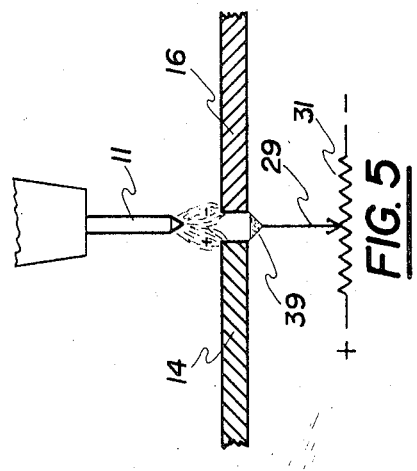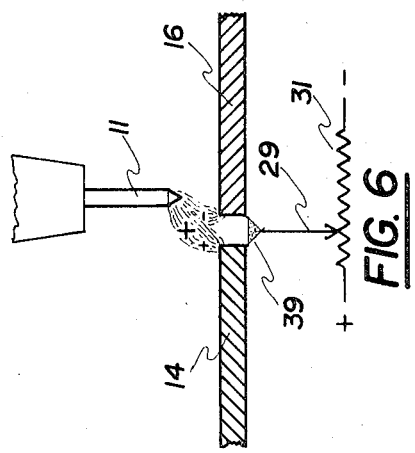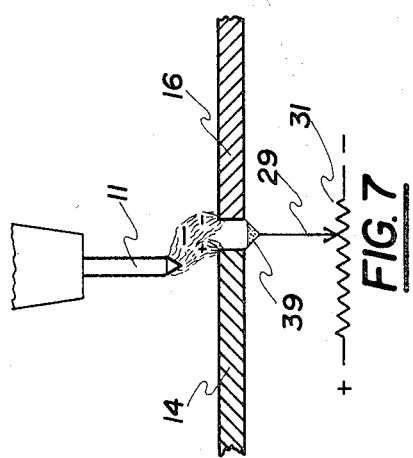

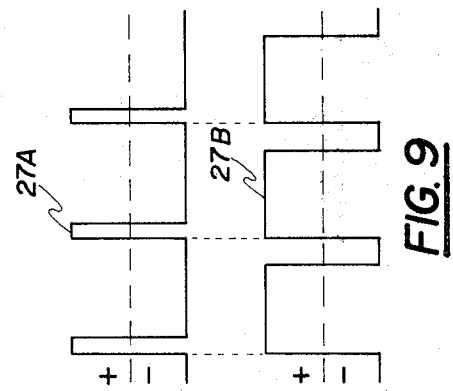
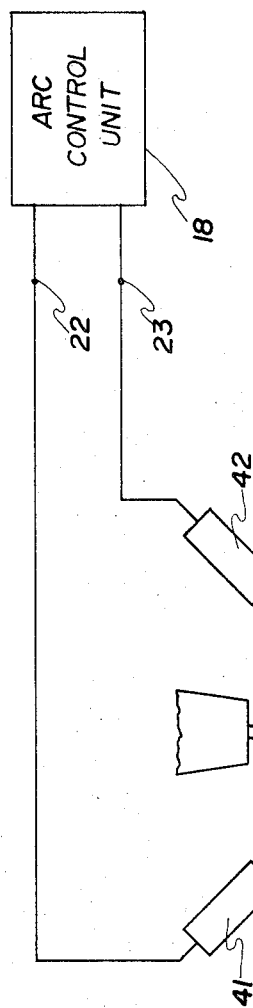
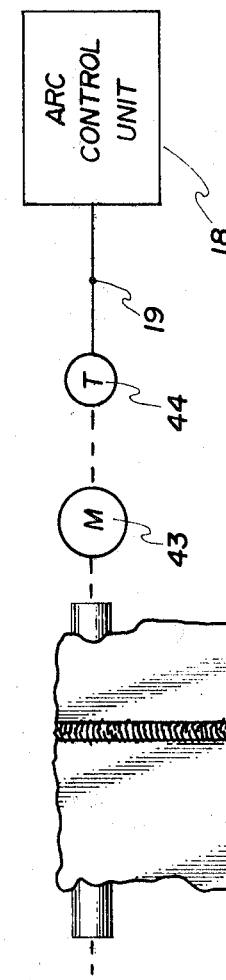
INVENTOR.
GERALD L. LAMPSON
BY
Richard K. Macneill

MAGNETIC CONTROL OF A WELDING ARC

PRIOR ART

The prior art for control of welding arcs by magnetic means is represented by U.S. Pat. No. 2,844,705, for Welding Method and Apparatus, issued to H.J. Bowman, et al. on July 22, 1958. This type of device, however, applies an alternating current to an electromagnet which symmetrically sweeps the welding arc but does not account for physical deviations in the materials to be welded, variations in the thickness of the materials as well, and the possibility of dissimilar metals being welded, which requires a variable dwell time. Not only are these conditions not provided for, but the automatic control of these variables are also not contemplated, such as variations in the width of the weld, thickness of the materials to be welded, etc., as the welding process is being performed.

BRIEF DESCRIPTION OF THE INVENTION

The present invention relates to the magnetic control of a welding arc and more particularly to the magnetic control of a welding arc in which a pulsed magnetic field is utilized.

According to the invention, an electromagnet is provided having at least one pole piece in proximity to a welding arc. The electromagnet is driven by a variable frequency, variable duty cycle, variable DC level and variable amplitude current waveform. In some applications, the current waveform will be a pulsating unidirectional current with the pole pieces of the electromagnet being displaced from the centerline of the arc, or a bias coil can be utilized to position the arc with respect to the work. The purpose of the variable duty cycle waveform for driving the electromagnet is to produce a magnetic field which varies the dwell time of the arc on the work wherein a longer or differential heating period is provided on one area with respect to another area.

Another novel feature of the invention lies in automatically varying the frequency, i.e., sweep rate of the arc with variations in the speed of the work as it passes the welding electrode.

Another novel feature lies in the sensing of the temperatures or relative heat of two areas, or two pieces of work being welded, as a control of the waveform symmetry which, in turn, controls relative dwell time on the work. A sensor for determining the desired arc position is also contemplated for zero positioning of the arc to compensate for slight variations or for positioning errors between the welding electrode and the work.

An object of the present invention is to provide improved magnetic control of a welding arc.

Another object of the invention is the provision of a magnetic control of the welding arc utilizing a pulsating unidirectional magnetic field.

A still further object of the invention is the provision of a magnetic control of a welding arc in which the relative dwell time can be varied.

Yet another object of the invention is the provision of a magnetic control of a welding arc in which relative dwell time is automatically controlled.

Yet another object of the invention is the provision of a magnetic field control of a welding arc in which the pole pieces of the magnetic field can be displaced from the centerline of the welding electrode.

A still further object of the invention is the provision of a magnetic control of a welding arc in which fine arc positioning is automatically sensed and maintained in a desired position.

Yet another object of the invention is the provision of a magnetic control of a welding arc in which the oscillating arc frequency is controlled by the relative speed of the work with respect to the arc.

Other objects and many of the attendant advantages of the invention will be readily appreciated as the same becomes better understood by reference to the following detailed description when considered in connection with the accompanying drawings in which like reference numerals designate like parts throughout the figures thereof and wherein:

FIGS. 5, 6 and 7 are schematic representations of a unique, fine beam positioning feature of the present invention;

FIG. 8 is a schematic representation of an automatic dwell time control system in conjunction with the present invention;

FIG. 9 is a graphic illustration of typical dwell time variations as a result of the control system of FIG. 8;

FIG. 10 illustrates in schematic form a sweep rate control system in conjunction with the present invention.

DETAILED DESCRIPTION OF THE DRAWINGS

Figure 1:
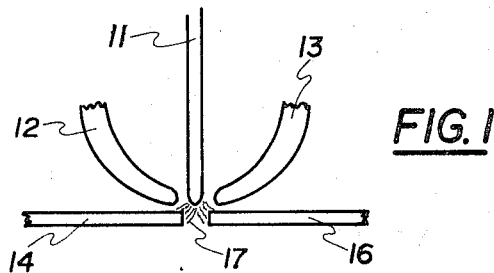
FIG. 1 is a schematic representation of a typical magnetically controlled welding arc. For purposes of clarification the pole pieces shown in the drawing have been rotated 90°.

Referring to FIG. 1, a welding electrode is shown at 11 with magnetic pole pieces 12 and 13 in proximity thereto. Work pieces 14 and 16 are also in proximity to welding electrode 11. A sweeping arc from welding electrode 11 is indicated by dotted lines 17.

Figure 2:
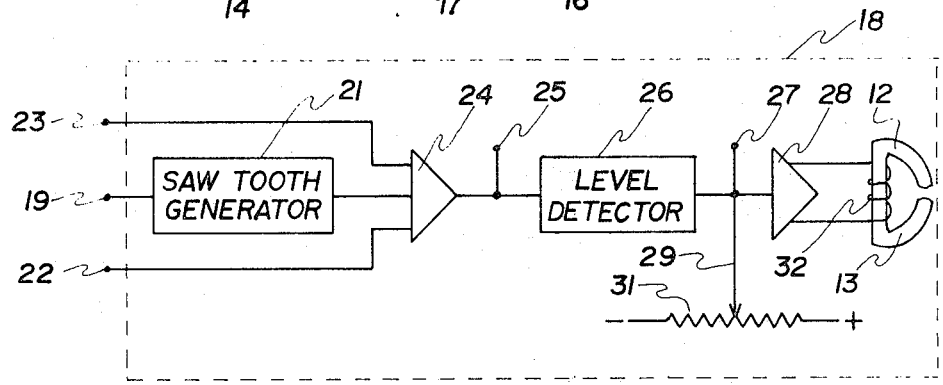
FIG. 2 is a schematic representation in block diagram form of the beam control unit of the present invention.

Referring to FIG. 2, an arc control unit is shown generally at 18 having one input terminal 19 coupled to a sawtooth waveform generator 21 and two other input terminals 22 and 23 coupled to DC control inputs of DC amplifier 24, which has an output 25 coupled to level detector 26. The output 27 of level detector 26 is coupled to an input of DC amplifier 28 as is wiper 29 on resistance 31; resistance 31 having one end connected to a negative potential and the other end to a positive potential. The output of DC amplifier 28 is coupled to an electromagnetic coil 32 having a core terminating in pole pieces 12 and 13.

Figure 3:
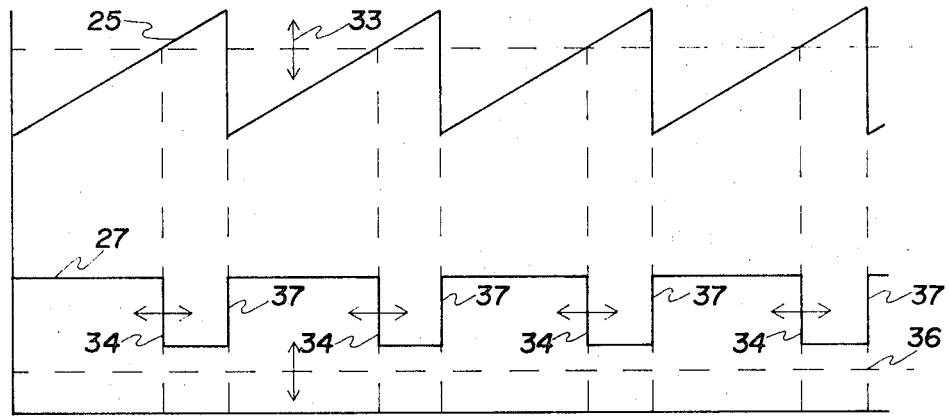
FIG. 3 is a graphic illustration of waveforms present in FIG. 2.

Referring to FIG. 3, the output 25 of DC amplifier 24 is shown as a sawtooth waveform. Variable zero base 33 is indicated by a vertical arrow. Waveform 27 is the output 27 of level detector 26 which is a square wave having a variable leading edge 34 as indicated by the horizontal arrows and a variable DC level, the zero reference being indicated by dotted lines 36. The leading edge 34 is determined by the zero crossover of waveform 25 with the trailing edge 37 being determined by the second zero crossover of each saw-toothed waveform.

Figure 4:
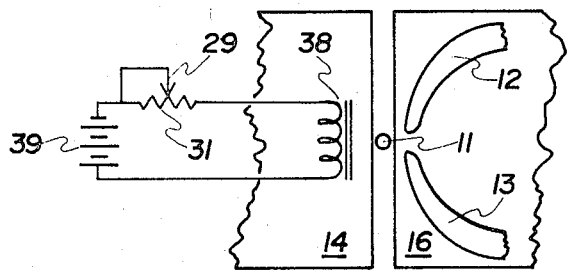
FIG. 4 is a schematic representation of a modification of the typical installation of FIG. 1.

Referring to FIG. 4, magnetic pole pieces 12 and 13 are shown displaced from the centerline of welding electrode 11 which is centered between work pieces 14 and 16. Here, bias coil 38 is in proximity to welding electrode 11 and is being driven by a direct current source 39 through a variable resistance 31.

Referring to FIGS. 5—8, welding electrode 11 is in proximity to work pieces 14a and 16a. Spot pyrometers, or heat sensors 41 and 42 are coupled to terminals 22 and 23, respectively, of beam control unit 18.

Referring to FIG. 9, the output 27 of level detector 26 (FIG. 2) is shown as waveforms 27a and 27b.

Referring to FIG. 10, a work carriage drive motor is shown at 43 which is mechanically coupled to a tachometer 44, the electrical output of tachometer 44 is coupled to the input terminal 19 of beam control unit 18.

OPERATION

Referring back to FIG. 1, the magnetic pole pieces 12 and 13 will deflect the arc from welding electrode 11 back and forth across the gap between work piece 14 and 16 if the magnetic field is pulsating. The beam control unit 18 of FIG. 2 is utilized to provide this pulsating magnetic field. Sawtooth generator 21 can be a free-running relaxation oscillator, for example, producing a sawtooth waveform having a frequency dependent upon an input control potential at input terminal 19. The output of the sawtooth generator is applied to DC amplifier 24, which by varying the DC potential at input terminals 22 and 23, adjusts the base reference of its output 25 (FIG. 3) depending upon the control voltages present at terminals 22 and 23. The output waveform from amplifier 24 is applied to the input of level detector 26, which serves to detect the zero crossing points of saw-toothed waveform 25.

The output 27 of level detector 26 is generally a square-wave (FIG. 3) having a variable leading edge depending upon the zero crossing of waveform 25. It will be apparent that by varying the position of the leading edge of the square-wave the symmetry of the waveform may be varied. Changes in symmetry of waveform 27 will cause changes in the symmetry of the magnetic field, which, in turn, will controllably vary the dwell time of the arc on each work piece. The DC level of DC amplifier 28 can be determined manually or by sliding contact 29 on resistance 31. The output of amplifier 28 then drives electromagnet 22 and pole pieces 12 and 13. As shown in FIG. 3, the output of DC amplifier 28 is above zero reference 36 which renders the magnetic field pulsating in one direction only. This, of course, can be changed to a symmetrical alternating current waveform as dictated by the positioning of pole pieces 12 and 13.

FIG. 4 shows a system whereby pole pieces 12 and 13 are not symmetrically disposed about the gap between work pieces 14 and 16 and illustrates one instance where a pulsating unidirectional current could be desirable as opposed to a symmetrical waveform. In this case, resistance 31 is shown as a variable resistance in series with DC source 39 and a bias coil 38. Bias coil 38 can act as a position device for statically displacing the arc from welding electrode 11. This type of installation is useful in converting existing mechanical systems to magnetic field control systems where the pole pieces cannot be symmetrically mounted around the welding electrode.

Referring to FIG. 5, resistance 31 is shown having a sliding contact 29 which is mechanically coupled to work pieces 14 and 16 via a work position follower. As can be seen in FIGS. 6 and 7, when there is a deviation in a linear gap from one side or the other, the wiper 29 is moved from the center of resistance 31 which causes a positive or negative voltage, depending upon the direction of deviation to be applied to the input of amplifier 28. These voltages serve as bias voltages to the coil and operate as a fine control of the arc position to compensate automatically for relatively small deviations as the work pieces are drawn past welding electrode 11. It will be apparent that other types of work position sensors, such as photoelectric types, may be used in place of the mechanically coupled type of sensor. Larger deviations in the relative position of the arc and area to be welded can be compensated for via a mechanical servocontrol system which would physically move the welding electrode mechanism transverse to the gap between the work pieces.

Referring to FIG. 8, a dwell time compensation system is shown with spot pyrometers 41 and 42 being located in proximity to work pieces 14a and 16a. Here, the work piece 14a is shown having a greater thickness than work piece 16a. Due to the different thickness of the work pieces, the desire dwell time of the arc is not the same for the work pieces. One method for automatically establishing the desired dwell ratio is to measure the heat of the two work pieces and adjust the dwell ratio to maintain equal heating. If the temperatures are equal, the outputs from spot pyrometers, or heat sensors, 41 and 42, will be equal resulting in no movement of the zero reference of waveform 25 and no dwell error correction, i.e., no change in the symmetry of waveform 27. As shown in FIG. 9, if the temperature of work piece 14a is greater than that of work piece 16a, one variation will be achieved in the output of zero detector 26, and, if the temperature of work piece 16a becomes greater than the temperature of work piece 14a, an opposite asymmetry will result in the waveform 27 at the output of level detector 26. The type of sensors or the arrangement thereof as well as the particular method of sensing the relative heat of selected portions of the material to be welded, as illustrated herein, are not part of the present invention. The particular embodiments illustrated herein for sensing relative heat or temperature, as well as those shown for sensing the position and velocity of the work piece, are also not part of the present invention, but serve as methods for sensing a particular condition and generating an electrical signal for automatically adjusting the magnetic field applied to the arc to maintain a desired arc sweep frequency, amplitude, position, or dwell ratio.

Referring to FIG. 10, a work carriage drive motor 43 is shown which is mechanically coupled for driving the work pieces past the welding arc. A tachometer 44 is mechanically coupled to work carriage drive motor 43 which will yield an output dependent upon the speed or work velocity. This output is coupled to input terminal 19 of beam control unit 18 resulting in varying the frequency of sawtooth generator 21 in accordance with the speed of work carriage drive motor 43.

It should be understood that although the terms "arc" or "welding arc" are utilized herein and this disclosure is made in reference to welding processes, the invention disclosed herein is not limited solely to welding, but is equally applicable to cutting or surfacing or other processes wherein an arc is utilized.

It should also be understood, of course, that the foregoing disclosure relates to only preferred embodiments of the invention and that it is intended to cover all changes and modifications of the example of the invention herein chosen for the purposes of the disclosure which do not constitute departures from the spirit and scope of the invention.

I claim:

1. A system for a magnetic control of a welding arc comprising:
    a welding electrode positioned and connected for welding a gap between first and second work pieces;
    an electromagnetic coil having at least one pole piece in proximity to said welding electrode and said gap, said pole piece being positioned for deflecting and sweeping any arc from said welding electrode in a direction generally transverse to the arc;
    a pulse generator connected to said electromagnetic coil; and
    said pulse generator supplying a unidirectional pulsating current to said electromagnetic coil.

2. The system for a magnetic control of a welding arc of claim 1 wherein:
    said pulse generator supplies variable symmetry pulses of voltage to said electromagnetic coil.

3. The system for a magnetic control of a welding arc of claim 1 and further including: first and second heat sensing means positioned in proximity to said first and second work pieces, said first and second heat sensing means coupled to said pulse generator for automatically controlling the symmetry of said pulses.

4. The system for a magnetic control of a welding arc of claim 1 wherein: said at least one pole piece is displaced at a right angle from the gap between said first and second work pieces in a horizontal plane.

5. The system for a magnetic control of a welding arc according to claim 1 and further including:
    a speed sensing means coupled to said first and second work pieces for sensing the speed of said first and second work pieces; and
    said speed sensing means coupled to said pulse generator and being operable to vary the frequency of said pulse generator directly with the speed of said first and second work pieces.

6. The system for a magnetic control of a welding arc according to claim 1 and further including:
    a work positioning sensor coupled to the gap between said first and second work pieces;
    said work positioning detector operable for producing a signal which varies with the relative position of said gap with respect to said welding electrode; and
    said work positioning detector electrically coupled to said pulse generator for varying the DC level of said pulses in accordance with deviations of said gap.

7. The system for a magnetic control of a welding arc according to claim 1 and further including:
   a work positioning sensor coupled to the gap between said first and second work pieces;
   said work positioning detector operable for producing a signal which varies with the relative position of said gap with respect to said welding electrode;
   a bias coil in operable proximity to said welding electrode and said gap; and
   said work positioning sensor electrically coupled to said bias coil for varying a DC bias current through said bias coil in accordance with the relative position of said gap and said welding electrode.